Patented Sept. 23, 1952

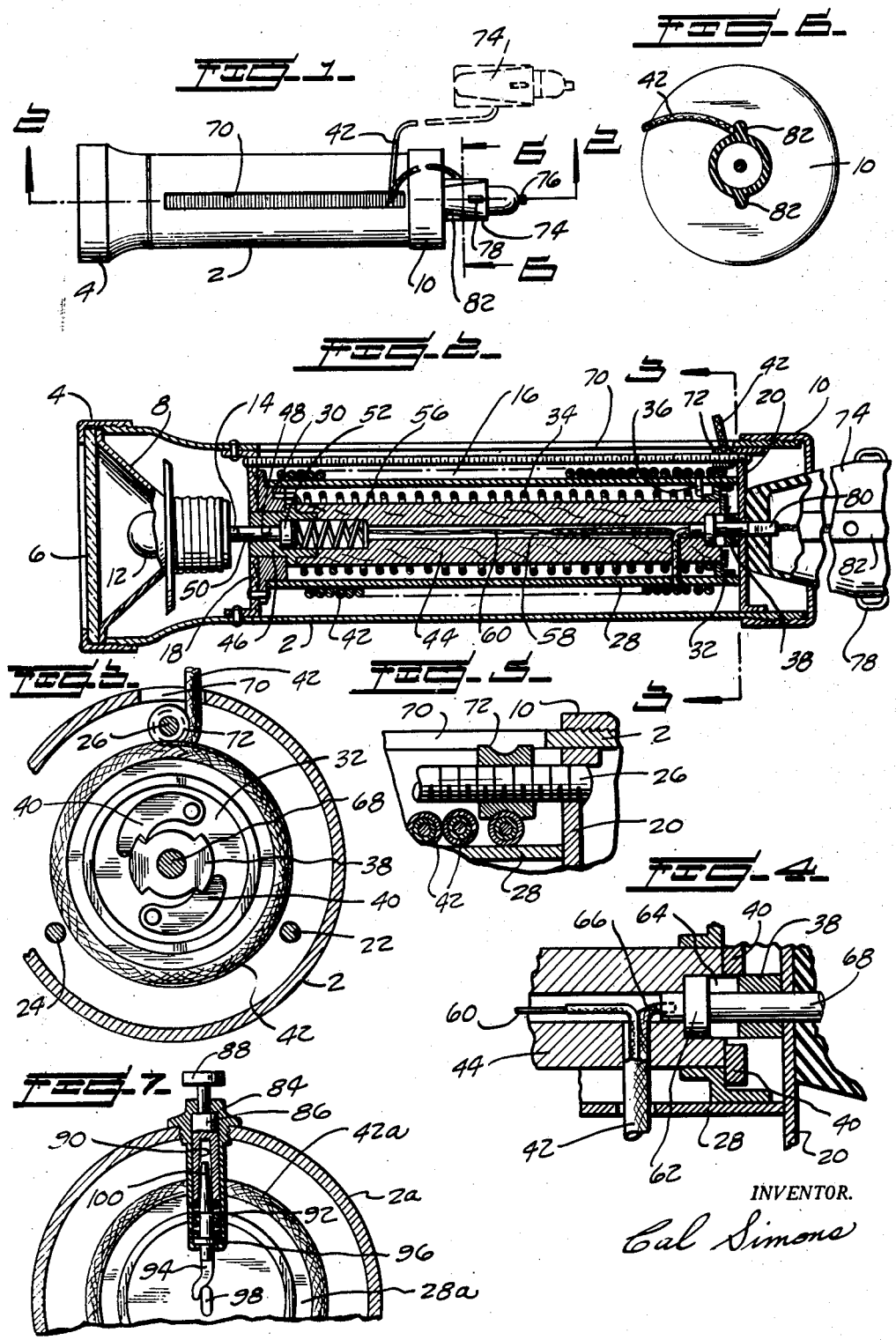

2,611,834

UNITED STATES PATENT OFFICE 2,611,834

COMBINATION SPOT AND TROUBLE LIGHT

Cal Simons, Detroit, Mich.

Application April 13, 1949, Serial No. 87,225

2 Claims. (Cl. 191—12.4)

This invention relates to portable lights and more particularly to a combination, spot and trouble light. The present light may be conveniently connected in the cigar or cigarette lighter receptacle available in all modern motor vehicle, and may be stored when not in use in the glove compartment or spring clip mounted in any convenient juxtaposed area within said vehicle for use. However, the present character of light may also without any modifications, excepting replacement of a suitable caliber of bulb, be used as a domestic or house light. By the utilization of the battery current circuit in a motor vehicle the increased illuminating efficiency that is thus gained, is contrasted with a conventional flashlight, of comparable size.

The primary object of the present invention resides in a trouble light having a conventional size outer case but affording the relative efficiency of illumination of a vehicle battery circuit.

Another object resides in a combination spot and trouble light having a convenient extensible circuit wire, that can be maintained at any desired length, obviating the usual snarling, and deterioration incumbent in contemporary designs, wherein the cord is not rewound.

A further object may be appreciated in the combination unitary circuit, affording the user a single wire compound in design.

A still further object resides in a combination spot and trouble light of a simple design, economical of manufacture and durable in use.

The foregoing, and other ancillary objects will appear hereinafter.

Similar reference characters appear in the several views, of the drawing, in which:

Fig. 1 is an elevational view of the invention and the contact plug adapted to be inserted in a lighter receptacle of a vehicle, Fig. 2 is a longitudinal sectional view taken along line 2—2 of Fig. 1, Fig. 3 is a transverse sectional view taken along line 3—3 of Fig. 2, showing the pawl and ratchet mechanism, Fig. 4 is a fragmentary detail sectional view showing the plural character of the circuit wire and connections used in the invention, Fig. 5 is also a fragmentary, detail sectional view showing the level wind ferrule means, Fig. 6 is a transverse sectional view taken along line 6—6 of Fig. 1, illustrating the manner in which the contact plug is keyed or secured in the end closure of the light case, and Fig. 7 is a transverse sectional view, similar to Fig. 3, of a modified stop or pawl and ratchet means operating to limit the amount the circuit wire that is paid out, when in use.

The combination spot and trouble light comprises generally an outer case 2, that is similar to or can be a conventional flashlight case. The forward end has threadedly mounted thereon, the cap 4, retaining the glass 6, and reflector, light assembly 8, in the case. The opposite or rear end has a suitable threadedly mounted closure cap 10, for maintaining parts therein. I have preferably shown in this instance a screw type light bulb 12, having a contact end 14 communicating with other means to be presently described.

The parts comprising the mechanism are shown as an assembly generally indicated as at 16, and are preassembled and mounted in the case 2. The assembly 16, is provided with an insulator plate and conductor plate 18 and 20 respectively and insulator plate 18 is shown riveted into the case 2. However for convenience the conductor plate 20 may be riveted only. Coaxial equally spaced longitudinal rods, 22, 24, and 26, are secured to end plates 18 and 20.

A circuit wire drum 28, is journalled on the flanged plate 30, fixedly mounted upon the insulator plate 18, and at its other end is closed by the plate 32, of the pawl and ratchet mechanism. A close wound, coil torsion spring 34, is anchored at one end to the plate 30, and having its free end secured to the wire drum 28 as at 36, thus it can be observed that as the drum is rotated, the spring 34 is wound and the stored energy serves to drive the wire drum in the opposite direction. Referring to Fig. 3, of the drawing, I have shown a pawl and ratchet mechanism, having the ratchet 38, and the pawls 40, this arrangement serves to operate unidirectionally and retain the stored up pre-load energy of the torsion spring for rewinding a circuit wire 42. The functional character of the wire drum 28, spring 34, and the circuit wire 42, is comparable to a conventional window shade rewind mechanism.

The torsion spring 34 is guided or piloted upon a spool 44 having the plate 32 of the pawl and ratchet mechanism secured thereto at one end, and having a bushing 46 fitted therein, and said bushing being similarly fitted into the plates 18 and 30, for assembly. The bushing 46 is bored as at 48 for the pin contact 50, for carrying the "hot" or positive end of the circuit to the light bulb contact 14. An enlarged head 52 on contact pin 50, slides in a bore 48, of the bushing 46, and is spring biased by a coil spring 56, maintaining the light contacts. A hole 58 extends for the greater length of the spool 44, and serves to enclose the wire 60, supplying one end of the circuit. A contact pin 62, is mounted in a bore 64, in the spool 44 and carries the ground end of the circuit wire 66, to the case 2, by contact pin extension 68, in the conductor plate 20, and thence to the case. The contact pin extension 68 (Fig. 4) extends thru the end plate 20. This plate formed of conductor material conducts current to the outer flashlight casing 2 by virtue of being pressed therein. The other end of the circuit is completed by the wire 60 thru spring 56, contact end 14 to the central contact of the bulb 12 thru the bulb filament and thence to the reflector assembly 8, that is held in contact to the outer casing by the end cap 4.

The circuit wire 42, is of a plural or dual character, that is, having an inner "hot" wire 60, suitably insulated and having an outer armor sheath conductor, providing the ground end 66, of the circuit. The circuit wire is fastened at the forward end of the wire drum 28, and is adapted to yieldably unwind against the pre-load of the torsion spring 34, and is stopped in suitable increment lengths by the pawl and ratchet mechanism for use.

A longitudinal slot 70, is formed in the case 2, and admits the circuit wire as it is paid out lengthwise on the wire drum 28. The uniform rewinding of the circuit wire 42, is obtained by a level wind ferrule 72, rotatably mounted on the screw thread formed on the rod 26, shown in Fig. 5 of the drawing.

A receptacle contact plug 74, having a spring biased contact end 76, and peripheral contacts 78, completes the circuit in the vehicle lighter contact receptacle.

To effectively resist inadvertent unwinding of the pawl and ratchet mechanism, I provide a flat portion 80, at the end of the contact extension 68, that is fitted into a similar flat shaped aperture in the end of the receptacle plug 74. The receptacle plug is similarly secured or keyed into the end closure cap 10, by virtue of the lugs or projections 82, fitting into cooperating similar shaped apertures in said cap. Thus the extension 68, having the ratchet 38, thereon is positively held against rotation.

I have shown in Fig. 7, of the drawing a modified form of stop mechanism operable from outside case. In this instance the case 2a, has a housing 84, thereon and extending therein. A plunger 86, has a finger button 88, outside and formed on its inner end an extension having a taper bore 90, and is spring biased by the compression spring 92. A ratchet pin 94 has an abutment 96, riding against the spring 92, urging the pin into engagement with ratchet flat 98, secured to the circuit wire drum 28a. When it is desired to stop the wire drum at any desired instant allowing the circuit wire 42a to unwind, the plunger is pressed downwardly by the finger button 88, and the taper bore 90, will engage the taper extension 100 of the ratchet pin 94, and the spring tension of the torsion spring will be overruled by the locking of the ratchet pin 94, and the ratchet flat 98. When the ratchet pin 94, is free to rise, the ratchet flat will be allowed to rotate unidirectionally only as by rotating in the opposite direction it cannot raise the ratchet pin 94, against the spring 92.

While I have described the principal embodiments of my invention, it is appreciated, those skilled in the art may make certain alterations, modifications or additions, and I should like to avail myself of any or all that may come within the purview of the appended claims.

I claim:

1. In a combination spot and trouble light of the class described, comprising: an outer casing containing a torsion spring loaded electrical circuit wire drum journalled in an insulator and a conductor plate in said casing, adapted to pay out said electrical circuit wire and having a selective pawl and ratchet means for limiting withdrawal of said electrical circuit wire, a light bulb connected in circuit with said electrical circuit wire, and said light bulb mounted at one end of said outer casing and said casing having at its other end a closure cap adapted to receive and maintain when not in use a cigarette lighter receptacle contact plug adapted to be removed and inserted into the receptacle of the cigarette lighter socket in an automobile for power, said receptacle contact plug having suitable contacts in circuit with said electrical circuit wire for the conduction of current for operation of the filament in said light bulb.

2. In an electrical receptacle plug mounting for spotter trouble lights, an outer casing containing a suitable winding mechanism for a circuit wire having one end thereof connected to a light bulb mounted at one end of the outer casing and having at the other end, an electrical receptacle contact plug, said contact plug adapted to be received in an aperture in an end closure cap threadedly mounted at the other end of the outer casing and the said contact plug having at one end a rectangular aperture therein for frictionally engaging the flattened end of a contact extension of the winding mechanism, said receptacle plug mounting adapted to permit convenient insertion and withdrawl of said electrical receptacle contact plug when the spot or trouble light is in use or stored.

CAL SIMONS.

REFERENCES CITED

The following references are of record in the file of this patent:

UNITED STATES PATENTS

| Number | Name | Date |
|---|---|---|
| 914,772 | Williamson | Mar. 9, 1909 |
| 982,651 | Wellman | Jan. 24, 1911 |
| 1,024,417 | Pagnod | Apr. 23, 1912 |
| 1,163,444 | Newell | Dec. 7, 1915 |
| 1,281,162 | Holloway | Oct. 8, 1918 |
| 1,330,974 | Bauman et al. | Feb. 17, 1920 |
| 1,464,631 | Spuehler | Aug. 14, 1923 |
| 1,659,160 | Richards | Feb. 14, 1928 |
| 1,730,104 | Wheat | Oct. 1, 1929 |
| 1,936,085 | Grant | Nov. 21, 1933 |
| 2,236,435 | Lockshin | Mar. 25, 1941 |